Nov. 18, 1969  J. JEROME  3,479,445
ELECTRICAL CABLE CONNECTION AND CONNECTOR SLEEVE
Original Filed July 2, 1964  2 Sheets-Sheet 1

INVENTOR
Jack Jerome
BY Sandoe, Neill,
Schotler & Wikstrom
ATTORNEYS.

Nov. 18, 1969    J. JEROME    3,479,445
ELECTRICAL CABLE CONNECTION AND CONNECTOR SLEEVE
Original Filed July 2, 1964    2 Sheets-Sheet 2
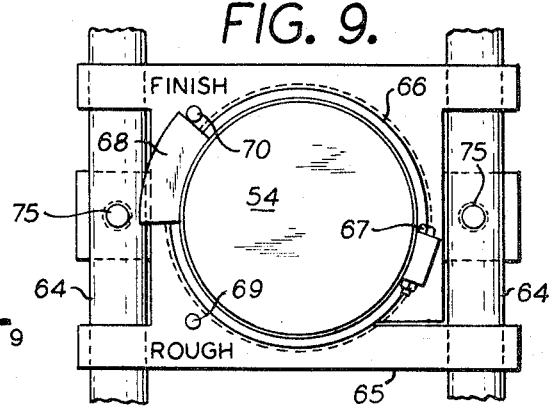
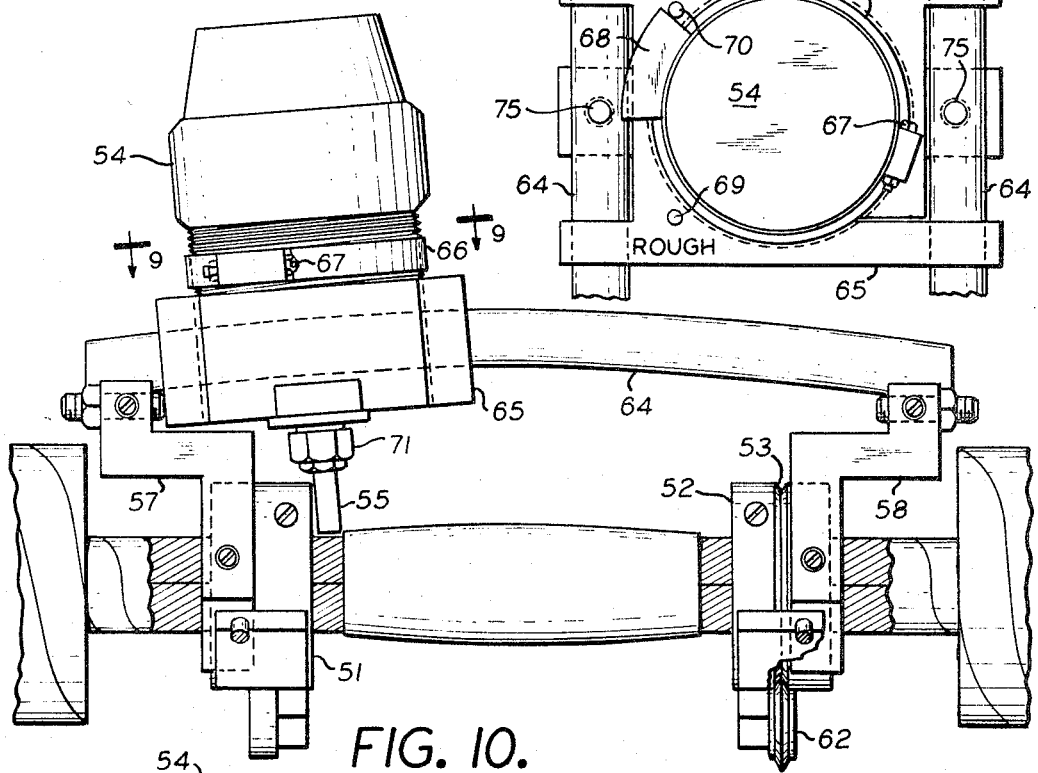
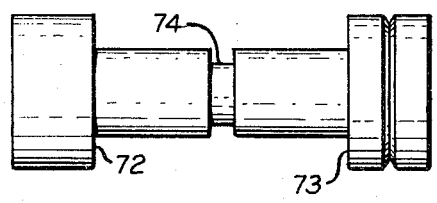
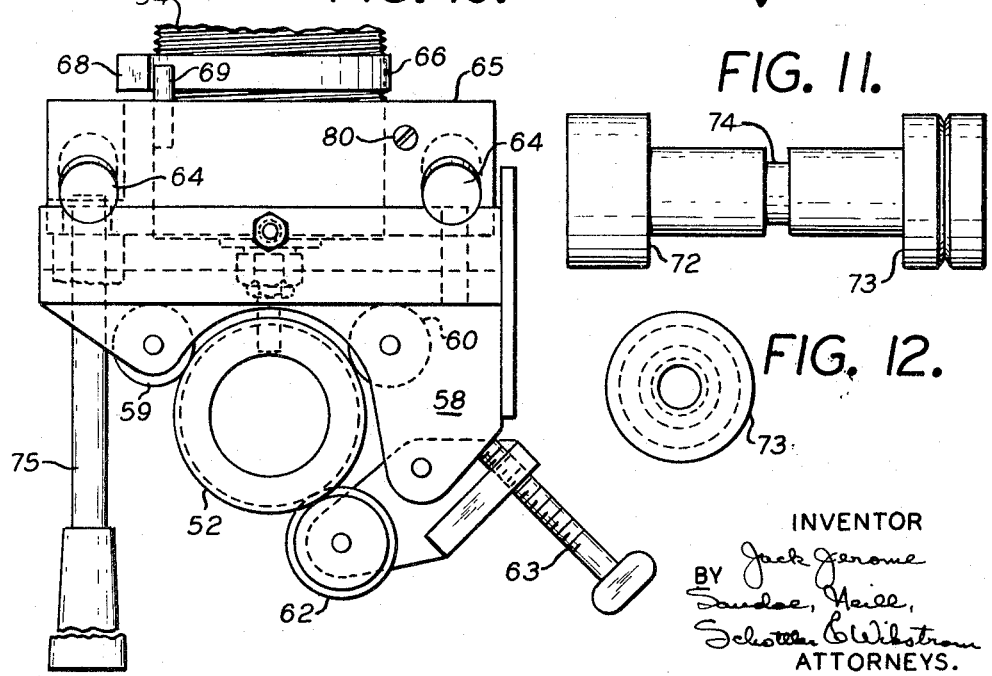
INVENTOR
Jack Jerome
BY
Sandoe, Neill,
Schotler & Wibstrom
ATTORNEYS.

3,479,445
ELECTRICAL CABLE CONNECTION AND CONNECTOR SLEEVE
Jack Jerome, 453 Roslyn Road,
East Williston, N.Y. 11596
Original application July 2, 1964, Ser. No. 379,810, now Patent No. 3,320,659, dated May 23, 1967. Divided and this application Feb. 20, 1967, Ser. No. 617,097
Int. Cl. H02g 15/08
U.S. Cl. 174—94         7 Claims

ABSTRACT OF THE DISCLOSURE

Cable connector sleeve of metal for receiving with a loose fit the cable ends to be connected, the inner surface of the sleeve being roughened and the outer surface having a plurality of circumferentially continuous indents spaced from each other and from the ends of the sleeve for engagement by a split compression die for pressing the metal of the sleeve under the indents radially inwardly into firm engagement with the cable ends; and the cable connection in which the sleeve, after being pressed onto the cable ends, is machined to barrel shape.

Cross references to related applications

This application is a division of application S.N. 379,810, filed July 2, 1964, now entitled "Method for Splicing Electrical Cables," now Patent No. 3,320,659. Note also Patent No. 3,353,448, granted on another division of S.N. 379,810.

Background and summary of the invention

This invention relates to splicing electrical cables, particularly the conductors of large insulated cables. Such cables usually are installed in underground ducts, if sheathed with lead, or they may be drawn into previously installed pipe lines which then are filled with an insulating oil or gas which is maintained continuously under pressure. The lengths of cables which can be made, transported and installed are limited by their size and weight, and cable lengths must be connected together in the field. The insulated cables are manufactured under optimum controlled conditions in factories and consequently danger of electrical breakdown in a cable length is slight. Connections between cable lengths usually must be made made in manholes where working space is limited and inconvenient and ambient conditions may be unfavorable.

Most of these cables are designed for operation at high or extra-high voltages. In order to minimize danger of electrical breakdown at the cable joints great care is exercised in making the joints. This invention is concerned with the splice between the conductors of two adjacent cable lengths. Ideally, from the standpoint of electrical considerations, the diameter at the splice would be the same as the conductor diameter, but there is no practical way of making such a splice.

It is an object of this invention to provide apparatus for producing an improved cable connection. It also is an object of this invenion to provide apparatus for accurately machining a cable connector sleeve to desired shape. Other objects and advantages of the invention will be described, or will appear as the description of certain specific illustrative embodiments proceeds.

This invention will be described with particular reference to the splicing of conductors of large paper insulated electrical cables, but it will be undersood that the invention is not restricted to such cables, but only by the appended claims.

For a number of years the usual procedure for splicing conductors of paper insulated cables involved the use of a copper sleeve within which the ends of the two conductors were disposed in alignment with each other. The conductors used in large paper insulated cables usually are of the segmental type and the ends of the conductors commonly are cut so as to overlap about an inch within the sleeve. This overlap might be made by cutting two adjacent segments of a four-segment strand about one inch shorter than the other two segments on each cable end, or, alternatively, the diametrically opposite segments could be shortened an inch. The connector sleeve, having first been pushed back over the end of one of the cables to permit accurate positioning of the two cable ends at the overlap, then was moved along the cable to center the sleeve over the overlapped cable ends. Then a four-ram press was used to press four indentations equally spaced around the connector sleeve into the connector and down to about the original cable diameter. The connector sleeve metal was deformed locally at the four indented places and pressed down into the cabel conductors. This pressing was repeated a second time on each half of the connector sleeve, and possibly a third time if the sleeve was unusually long, or if high tensile strength requirements had to be met. These indentations in the outer surface of the connector sleeve usually were roughened, as by a tap, and lead plugs were inserted and hammered down to conform to the outside contour of the connector sleeve. The overall diameter of the connector sleeve was rather large and was uniform for all or most of its length. The gripping of the cables by the connector sleeve was limited to the relatively small areas directly under the pressure points.

More recently the four-ram press method of connecting cables has been largely superseded by use of what is known as the T & B press. In this procedure a copper sleeve having short tapered ends is placed over one of the cable ends and the two cable ends are brought together, preferably in overlapping relation as described herein above. Then the copper sleeve is moved along the cable until it is centered over the overlapping cable ends. The copper sleeve, initially cylindrical in shape, then is deformed by die pressure in a series of steps to hexagonal shape. The deforming begins at the center of the connector sleeves for a width of about one-half inch to one inch, depending on the size of the connector, and progresses toward the ends of the connector in overlapping steps. With every compression step the connector sleeve is lengthened slightly and there also will be some elongation of the cables within the sleeve, but this elongation of the cables will be relatively slight because the sleeve still is more or less free to elongate over the cables. The next step is to reconvert the hexagonal shape of the sleeve to a cylindrical shape by a series of compression operations similar to those employed to give the hexagonal shape. This results in a substantial further elongation of the connector sleeve. Since the sleeve was locked to the cables during the first compression operation, reconversion to cylindrical shape also produces a substantial elongation of the cables which now are locked within the sleeve. The result is that the cable bows and assumes a shape somewhat like that of a banana. This is undesirable.

By the present invention two cabel ends are spliced together with little or no elongation of the cables. A mechanically strong splice is produced which has a smooth barrel shape. The finished conductor splice is free from corners and sharp edges and there are no places for concentration of electrical stress with inherent danger of weakening the overlying insulation.

Brief description of the drawings

This invention will be more clearly understood from the following description taken in connection with the accompanying drawings, showing preferred illustrative embodiments, in which:

FIGURE 8 is a side view of apparatus for machining the compressed connector sleeve to the desired final shape;

FIGURE 9 is a view taken substantially on line 9—9 of FIGURE 8, showing the mechanism for adjusting the motor and router radially of the cable axis;

FIGURE 10 is an end view of the apparatus of FIGURE 8, from the righthand side of that figure;

FIGURE 11 is a side view of a gauge used in the adjustment of the motor and router relative to the cable; and FIGURE 12 is an end view of the gauge shown in FIGURE 11.

Description of the preferred embodiment

Figure 1:
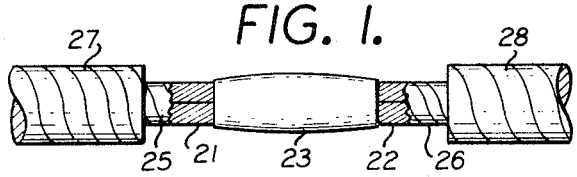
FIGURE 1 shows a splice connecting the conductors of two paper insulated cables.

Referring first to FIGURE 1, two segmental cable conductor ends 21 and 22 are shown spliced together by the connector sleeve 23 of this invention. The sleeve 23 has a regular smooth barrel shape which tapers down curvilinearly until at its ends it is almost down to the conductor diameter, thereby avoiding the corners and sharp edges produced by the previously known practices. The cable conductors ordinarily will be shielded, as illustrated at 25 and 26, and insulated with relatively thick walls of overlying helically wrapped paper tapes shown at 27 and 28. Cable sheaths or pipe enclosures will be employed in known manner, but are not shown.

Figure 2:
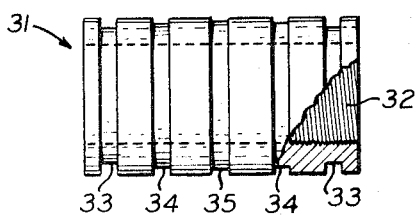
FIGURE 2 shows to enlarged scale a connector sleeve in elevation, a portion of the sleeve being cut away to show the interior.
Figure 3:
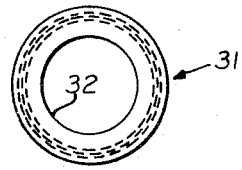
FIGURE 3 is an end view of the connector sleeve shown in FIGURE 2.

FIGURES 2 and 3 show a typical connector sleeve suitable for making the cable splice illustrated in FIGURE 1 by the method and apparatus of this invention. The cylindrical sleeve 31, preferably of dead soft copper for connecting copper cables, has a roughened inner surface for better gripping the cable ends when compressed thereon. The rough surface conveniently is provided by cutting a shallow thread throughout the length of the sleeve, indicated at 32. The inner diameter of the sleeve is such as to provide a loose fit on the cables to be spliced together, for example, a clearance of about 20 to 30 mils for cables having a 1½" diameter.

The outer surface of the connector sleeve is provided with a plurality of circumferentially continuous indents or channels 33, 34 and 35 which are spaced from each other and from the ends of the sleeve. In the illustrative embodiment there are five of these indents and they all may be of the same width. The spacing between the indents preferably is at least equal to the width of the indents and it may be somewhat greater, as is illustrated in FIGURE 2. Preferably the indents 33 nearest the ends of the sleeve are deeper than the center indent 35, and where a sleeve has more than three indents the depth may be graduated from shallowest for the center one to deepest for the two end ones, as shown in FIGURE 2. The radial thickness of the connector sleeve at the bottom of each of the indents must be greater than the desired final thickness of the connector at that region after the connector has been compressed onto the cable.

Ordinarily five indents will provide a cable splice having a pullout strength equal to 50% or more of the tensile strength of the cable. This will meet most requirements. The pullout strength can be increased by making the connector sleeve longer and by increasing the number of indents, even to the full tensile strength of the cable.

Figure 4:
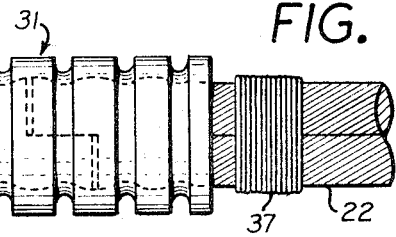
FIGURE 4 is a view showing a connector sleeve of the type illustrated in FIGURE 2 which has been compressed onto two overlapping cable ends, but which has not yet been machined down to the final barrel shape shown in FIGURE 1.

FIGURE 4 shows the connector sleeve 31 after it has been compressed onto the aligned cable ends 21, 22, before the sleeve has been machined to the final shape shown in FIGURE 1. As shown by the broken lines, the ends of the segmental cables 21, 22 were cut to overlap. The connector sleeve, having first been threaded onto one of the cable ends, was centered on the overlap prior to compressing the sleeve on the cables. The amount of overlap of the cable ends is not critical, but preferably is of the order of about an inch. There may be slight gaps between the ends of the aligned segments, as indicated in the drawing, but this is of no particular consequence in an overlapped cable end splice.

The splice of this invention can be employed for splicing cables which are simply butted end to end, but this would necessitate use of a thicker walled connector having a metal cross section sufficient to carry the full current load. Moreover, for the same length of connector sleeve and number of compression indents the pullout strength would be less than for an overlapped cable end splice.

In FIGURE 4 the connector sleeve at each of the circumferential indents is shown pressed down into the aligned cable ends. The compression force is sufficient and is so applied as to indent the cable uniformly around its entire circumference. Thus, in a longitudinal section through the connected cable ends the contact surface between the cables and the sleeve will have a regular undulating form as shown by broken lines in FIGURE 4, and as shown in the broken away lower righthand portion of FIGURE 7. Under each compressed indent of the connector sleeve the cable is gripped firmly and uniformly around its entire circumference.

As shown in FIGURE 4, temporary wire wrapping 37 may be applied around the cables for short distances near the ends of the connector sleeve prior to compressing the sleeve onto the cables. The purpose of these wrappings is to prevent bird-caging of the cables in the regions where split ring clamps are to be applied for the purpose hereinafter described. These temporary wrappings 37 will be removed after the compressing operation has been completed.

Figure 6:
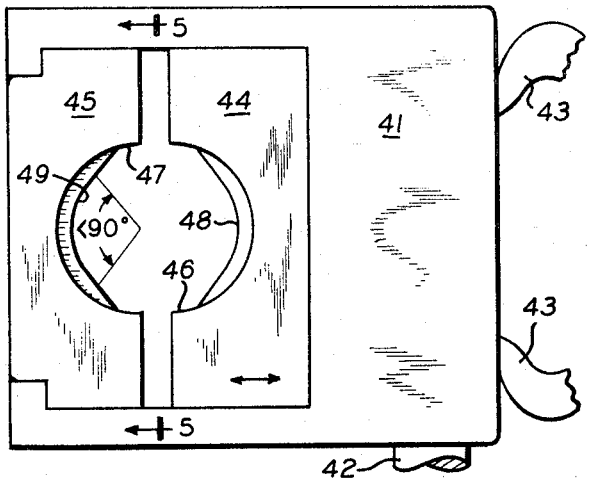
FIGURE 6 is a side view of the connector sleeve compression device with two cooperating dies in place.

Compression of the connector sleeve onto the aligned cable ends can be accomplished by a hydraulic press such as is shown, more or less diagrammatically, in FIGURE 6. Since the cable splices will be made at locations in the field, and usually in manholes or other limited spaces, the press mechanism necessarily must be portable, and preferably of limited size and weight. To this end the compression applied at the indents may be applied to one indent at a time, and in two steps for each indent.

Figure 5:
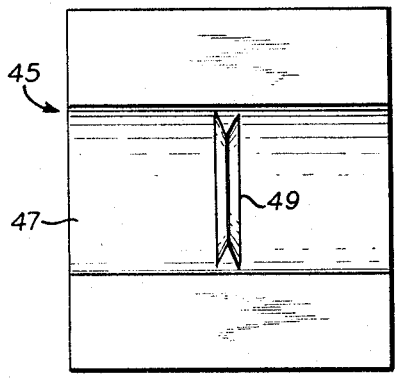
FIGURE 5 is a view looking at the face of one of the compression die members, substantially on line 5—5 of FIGURE 6.

In the apparatus illustrated in FIGURES 5 and 6, a hydraulic press, indicated generally at 41, has a flexible hydraulic pressure connection 42 and a handhold 43 for holding and manipulating the press. A die member 44 can be actuated to right or left by control of the hydraulic press. The die member 44 coacts with removable die member 45 to apply pressure to a connector sleeve after the press has been mounted on the connector. The concave semi-cylindrical die surfaces 46, 47 of the die members 44, 45 conform to the outside diameter of the connector sleeve 31.

To mount the press on a connector sleeve which has been centered on aligned cable ends the die member 45 is removed by sliding it from the frame of the press. The die 44 then is actuated to its maximum withdrawn position and the press is moved so that the die member 44 engages the connector sleeve 31. The centrally disposed ridge 48 on the concave die surface engages the center indent 35 of the indents of the connector sleeve. The die member 45 then is slid into place in the press with its centrally disposed ridge 49 directly opposite the ridge 48. The press is actuated, first only enough to make certain that the die ridges are accurately engaging the indent 35, and then to press the metal of the connector sleeve radially inwardly under the ridges 48, 49 into the cables. Next, the hydraulic pressure is released and the die member 44 withdrawn sufficiently to permit turning the press 90° about the connector sleeve. Then pressure is again applied to complete the pressing of the sleeve metal into the cable around the entire circumference of the indent.

It is desired that during the compressing operation the metal of the sleeve move only radially inwardly. To insure this result the tops of the ridges 48, 49 should have a circumferential extent greater than 90°, and the ends of the ridges should have tangentially sloping surfaces as shown in FIGURE 6. The die members 44, 45 preferably are at least as wide as the length of the connector sleeve 31. This will prevent bending of the connector sleeve during the compressing operation.

Compression of the center indent 35 in the manner described locks the connector sleeve to the overlapped cable ends. Next, the indents 34 on either side of the center indent are compressed in similar manner, and then the end indents 33 are compressed. This produces the condition illustrated in FIGURE 4.

For compressing a single indent at a time, as described hereinabove, a 40 ton hydraulic press has been found to be adequate for 2,000 MCM cable having a diameter of 1 and ½". Use of a large press, e.g., 60 to 100 tons capacity, would permit the use of die members having a plurality of ridges to press two or more indents at one time. This would reduce the number of steps and the time required.

After the connector sleeve has been pressed onto the cable ends the temporary binding wires 37 are removed and the sleeve then is ready to be machined to its final desired shape.

Because of the cramped space in which this machining operation must be performed it was necessary to produce novel apparatus and method for accomplishing the object. Such apparatus is illustrated in FIGURES 8–12 of the drawings and will now be described.

Two split ring clamps 51, 52 are secured firmly on the cables where the temporary binding wires 37 were located. The outer surfaces of these split ring clamps provide tracks for rotating the frame of the machining apparatus about the connector sleeve. The outer surface of the split ring clamp 51 is a smooth cylinder, and split ring clamp 52 is similar except that it has a circumferential groove 53.

Shown mounted on the ring clamps 51, 52, for rotation therearound, is a frame which carries a motor 54 for driving a router bit 55 to turn down the outside of the connector sleeve. The frame comprises end members 57, 58 which engage the split ring clamps 51, 52. Each of the end members is provided with two fixed wheels 59, 60 and an adjustably mounted wheel 62 which roll on the tracks of the split ring clamps. By means of the adjusting screw 63 the movable wheel 62 may be withdrawn sufficiently to permit the end member to be placed on and removed from its split ring clamp.

The end members 57, 58 are rigidly connected by two outwardly bowed slide bars 64. The frame, comprising the end members 57, 58 and the slide bars 64, is rotatable around the connector sleeve. Movement of the frame lengthwise of the connector sleeve is prevented by providing the wheel 62 which engages the split ring clamp 52 with a circumferential ridge which engages the circumferential groove 53 in the surface of the split ring clamp.

Mounted on and movable back and forth along the bowed slide bars 64 is carriage 65. Mounted in the carriage 65 so as to be adjustable radially toward and away from the connector sleeve is the motor 54, for example, a compact 1¼ H.P. electric motor. Desirably, adjustability of the motor with respect to the carriage is accomplished by providing the external shell of the motor and carriage with cooperating screw threads so that adjustment can be made simply by turning the motor about its shaft axis.

The motor 54 can be locked against rotation in the carriage 65 as by means of a screw 80. Engaging the screw threaded exterior of the motor above the carriage 65 is a split ring 66 having screw means 67 for locking the ring in adjusted position on the motor. On the split ring 66, opposite the screw means 67, is a stop member 68. Rotation of the split ring 66, and of the motor 54 when the split ring is clamped thereon, is limited by pins 69, 70 projecting upwardly from the carriage 65 in the path of the stop member 68. The function of the split ring 66 and these pins 69, 70 will be described hereinafter.

The inner end of the motor shaft is provided with a clutch 71 for holding the router bit 55. A standard ⅜" router bit may be employed.

In order to adjust the motor 54 in the carriage 65 for machining a connector sleeve it is desirable to use a gauge member. Such a member, showing to somewhat reduced scale, is illustrated in FIGURES 11 and 12. The gauge preferably is made from a single piece of metal and is of a generally dumbbell shape. The ends 72, 73 of the gauge conform in size, shape and spacing to the split ring clamps 51, 52. The main portion of the connecting section has a groove 74 in the center which is machined to the same diameter as the finished connector is to have at its center. In use, the gauge is placed in the machining apparatus before the apparatus is placed on the connected cable ends. The screws 63 are adjusted so that the ends 72, 73 of the gauge are located in the apparatus in the same way that the split ring clamps 51, 52 will be positioned during the machining operation. With the carriage 65 at the center of the slide bars 64, the split ring 66 is loosened and the motor 54 is freed so that it can be turned in the carriage 65. The motor is turned down by hand until the end of the router bit 55 just touches the portion 74 of the gauge. The motor is then turned back very slightly and the motor set screw 80 is turned to lock the motor against further turning in carriage 65. The split ring 66 then is turned so that the stop member 68 engages the "Finish" pin 70, and the screw 67 is tightened to clamp the ring against further rotation on to motor. Then the motor set screw 80 is loosened and the motor is turned out a portion of a turn until the stop member 68 engaegs the "Rough" pin 69. This withdraws the router a definite short distance from the gauge surface 74. The motor set screw 80 then is tightened to prevent further turning of the motor in the carriage 65 and the apparatus is ready for turning down the connector sleeve.

The gauge then is removed from the machining apparatus and the apparatus is installed on the connected cable ends with the motor carriage at one end of the slide bars so that the end of the router bit enters between the split ring clamp 51 and the end of the connector.

Means are provided for locking the motor carriage at any adjusted position along the slide bars 64. Conveniently, this may be done by two similar handles 75 which may be turned to clamp and unclamp the carriage on the slide bars. These handles 75 also are useful for turning the apparatus about the connected cable ends during the machining operation.

With this apparatus installed on the connected cable ends as above described, the motor 54 is started and the carriage 65 is moved to the right so that the router bit cuts into the material of the connector sleeve. The distance of movement should not be greater than the diameter of the router bit. The carriage 65 then is locked against further movement along the slide bars 64 and the apparatus is turned back and forth around the connected cable ends to remove a circumferential cut from the end of the connector sleeve. When this cut is circumferentially complete the carriage 65 is moved a short distance along the slide bars 64 and another circumferential cut is made adjacent to and overlapping the first cut. This procedure is repeated until the entire connector sleeve has been machined in this manner to a barrel shape.

This "Rough" cut removes a substantial amount of metal and the surface of the connector sleeve may show slight circumferential scoring. To provide a smooth surface the "finish" cut next is made. Without removing the apparatus from the connected cable ends the screw 80 locking the motor in the carriage 65 is released and the motor 54 is turned to move the router bit inwardly until the stop 68 engages the "Finish" pin 70. The screw 80 then is tightened to prevent further turning of the motor in the carriage. The carriage then is moved back and forth along the slide rods 64 as it is gradually worked around the connected cable ends. Upon completion, the resulting surface of the now barrel-shaped connector sleeve is smooth and uniform and the machining apparatus may be removed from the connected cable ends. If desired, the surface of the connector sleeve can be further finished by a file or emery tape.

The amount of bow in the slide rods 64 determines the precise finished shape of the connector sleeve. This may be varied to meet customer specifications. For most splices of overlapped cable ends the metal cross section of the connector sleeve at its longitudinal center desirably is about one-half the metal cross section of the cable. The diameter of the connector sleeve at its ends ordinarily should closely approach the diameter of the cables. With the apparatus herein described it is practical to make the thickness of the connector sleeve at its ends about 0.040, or less. Merely by way of an example, for a 2000 MCM overlapped cable splice and connector length of the order of 5" the radius of the bow might be about 42".

Figure 7:
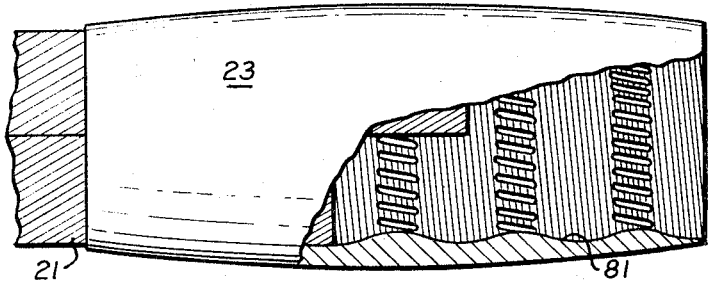
FIGURE 7 is a further enlarged view of a finished cable splice, part of the connector wall being cut away and one of the cable ends being removed to illustrate the circumferential compression zones.

The finished connector sleeve is shown in FIGURE 7. The cable ends are gripped and firmly held by a plurality of circumferentially continuous compressed zones corresponding in number to the number of indents on the connector sleeve which was used. In these zones the metal of the connector sleeve is pressed into the cable and into the spaces between cable strands. The contact surface between the cable and the connector sleeve, as revealed by a longitudinal section through the splice, is a gradually undulating line shown at 81. The metal of the connector sleeve, originally soft, is hardened somewhat by working in the compression zones, but remains soft in the intervening zones. This produces a cable connection in which at the critical gripping zones the metal is relatively hard and resistant to pullout, while in the intervening and end zones the metal remains soft and retains its low electrical resistance.

While specific embodiments of the invention have been described for purposes of illustration it will be understood that the invention may be variously modified and embodied within the scope of the sub-joined claims.

I claim:
1. An electrical cable connection of the compression type comprising in combination, two cable ends and a barrel-shaped metal sleeve into opposite ends of which the cable ends extend in aligned adjacency and within which the cable ends are secured by compression of the sleeve in situ on the cable ends, characterized by the fact that the thickness of the sleeve is greatest at its center and varies along a uniform curvilinear path to the minimum at the ends of the sleeve.

2. An electrical cable connection as set forth in claim 1 in which the metal cross section of the sleeve at its longitudinal center is approximately equal to one-half the metal cross section of the cable.

3. An electrical cable connection as set forth in claim 1 in which the cable ends overlap within the sleeve.

4. An electrical cable connection of the compression type comprising, in combination, two cable ends and a barrel-shaped metal sleeve into the opposite ends of which the cable ends extend in aligned adjacency and within which the cable ends are secured by circumferential compression zones spaced from each other and from the ends of the sleeve along the length of the sleeve, the thickness of the sleeve being greatest at its center and varying along a uniform curvilinear path to the minimum at its ends, the metal of the sleeve in the compression zones being hardened and the metal of the sleeve in the intervening zones and at the ends of the sleeve being relatively soft.

5. An electrical cable connection as set forth in claim 4 in which the circumferential compression zones all are of substantially the same width and are spaced from each other and from the ends of the sleeve by uncompressed zones of substantially the same width as the compression zones.

6. An electrical cable connection as set forth in claim 4 in which the cable ends overlap within the sleeve and in which one of the compression zones overlies the cable overlap.

7. A compression type connector sleeve for connecting electrical cables comprising, a cylindrical metal sleeve into the opposite ends of which the ends of the cables to be connected are to be disposed in aligned adjacency, the inner diameter of the sleeve providing a loose fit for the cable ends and the inner surface of the sleeve being roughened, and the outer surface of the sleeve having a plurality of circumferentially continuous indents spaced from each other and from the ends of the sleeve for engagement by a split compression die for pressing the metal of the sleeve under the indents radially inwardly into firm engagement with the cable ends, the indents being of substantially the same width and the spacing between adjacent indents being at least equal to the indent width, radial thickness of the sleeve at the bottom of each of the indents being greater than the desired final thickness of the connector at that region after the connector has been compressed on the cable ends, the depths of the end indents being greater than that of the center indent.

References Cited

UNITED STATES PATENTS 3,036,147   5/1962   Wheaton et al. _____ 174—90 XR

FOREIGN PATENTS 775,557   5/1957   Great Britain.

DARRELL L. CLAY, Primary Examiner

U.S. Cl. X.R.,
174—90; 287—109